(12) United States Patent
McBride et al.

(10) Patent No.: US 11,175,908 B2
(45) Date of Patent: Nov. 16, 2021

(54) DYNAMIC FEATURE AND PERFORMANCE TESTING AND ADJUSTMENT

(71) Applicant: MX Technologies, Inc., Lehi, UT (US)

(72) Inventors: Ryan McBride, Lehi, UT (US);
Brandon Dewitt, Provo, UT (US);
Shane Smit, American Fork, UT (US);
Josh Bodily, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 16/714,675

(22) Filed: Dec. 13, 2019

(65) Prior Publication Data

US 2020/0117588 A1    Apr. 16, 2020

Related U.S. Application Data

(63) Continuation of application No. 16/128,385, filed on Sep. 11, 2018.

(60) Provisional application No. 62/561,203, filed on Sep. 20, 2017, provisional application No. 62/556,562, filed on Sep. 11, 2017.

(51) Int. Cl.
*G06F 8/70* (2018.01)
*G06F 11/36* (2006.01)
*G06N 20/00* (2019.01)

(52) U.S. Cl.
CPC ............ *G06F 8/70* (2013.01); *G06F 11/3688* (2013.01); *G06F 11/3692* (2013.01); *G06N 20/00* (2019.01); *G06F 11/3664* (2013.01)

(58) Field of Classification Search
None
See application file for complete search history.

(56) References Cited

U.S. PATENT DOCUMENTS

| | | | |
|---|---|---|---|
| 8,326,944 B1 | 12/2012 | Wick et al. | |
| 10,891,126 B2 | 1/2021 | Dewitt et al. | |
| 2005/0190279 A1* | 9/2005 | Nobels | H04N 1/00127 348/333.02 |
| 2006/0274869 A1 | 12/2006 | Morse | |
| 2007/0101197 A1 | 5/2007 | Moore et al. | |
| 2007/0127426 A1 | 6/2007 | Watters et al. | |

(Continued)

OTHER PUBLICATIONS

U.S. Appl. No. 16/128,385, Office Action, dated May 18, 2020, pp. 1-29.

(Continued)

*Primary Examiner* — Qing Chen
(74) *Attorney, Agent, or Firm* — Kunzler Bean & Adamson, PC

(57) ABSTRACT

Apparatuses, methods, systems, and computer program products are presented for dynamic feature and performance testing and adjustment. An audit module is configured to dynamically test a plurality of image capture settings for a camera of a mobile device of an end user in an executable mobile application executing on the mobile device. A feature module is configured to select one of a plurality of image capture settings for a camera of a mobile device based on a dynamic test. An adjustment module is configured to dynamically configure, during runtime of an executable mobile application on a plurality of different mobile devices of different end users, the different mobile devices to use a selected one of a plurality of image capture settings.

20 Claims, 4 Drawing Sheets

(56) References Cited

U.S. PATENT DOCUMENTS

| | | | |
|---|---|---|---|
| 2008/0050111 A1* | 2/2008 | Lee | G03B 19/00 396/429 |
| 2008/0282172 A1 | 11/2008 | Bayang et al. | |
| 2008/0305775 A1 | 12/2008 | Aaltonen et al. | |
| 2008/0305778 A1 | 12/2008 | Aaltonen et al. | |
| 2009/0086050 A1* | 4/2009 | Kasakawa | H04N 5/23219 348/222.1 |
| 2009/0196509 A1* | 8/2009 | Farrer | G06K 9/00221 382/209 |
| 2010/0058201 A1 | 3/2010 | Harvey et al. | |
| 2010/0082470 A1* | 4/2010 | Walach | G06Q 20/0425 705/35 |
| 2010/0136951 A1* | 6/2010 | Rosenberg | G06Q 30/06 455/412.1 |
| 2010/0151903 A1* | 6/2010 | Yamamoto | H04N 21/4788 455/556.1 |
| 2013/0346949 A1 | 12/2013 | Chang et al. | |
| 2014/0078315 A1* | 3/2014 | Carlsson | H04N 5/232 348/187 |
| 2014/0204245 A1* | 7/2014 | Wexler | G06F 1/163 348/231.99 |
| 2015/0092066 A1* | 4/2015 | Geiss | H04N 13/239 348/180 |
| 2015/0208258 A1 | 7/2015 | Brenzel et al. | |
| 2015/0230022 A1* | 8/2015 | Sakai | H04R 1/1041 381/58 |
| 2016/0014405 A1* | 1/2016 | Beckman | H04N 5/2254 348/187 |
| 2016/0044520 A1* | 2/2016 | Iyer | H04W 24/08 370/252 |
| 2016/0196737 A1 | 7/2016 | Martin et al. | |
| 2017/0064205 A1* | 3/2017 | Choi | H04N 5/23293 |
| 2017/0098159 A1 | 4/2017 | Sharifi et al. | |
| 2017/0220102 A1* | 8/2017 | Kim | G06K 9/4661 |
| 2018/0054559 A1* | 2/2018 | Welker | H04N 5/23206 |
| 2018/0060218 A1* | 3/2018 | Li | G06F 11/302 |

OTHER PUBLICATIONS

U.S. Appl. No. 16/128,385, Notice of Allowance, dated Sep. 9, 2020.

* cited by examiner

DYNAMIC FEATURE AND PERFORMANCE TESTING AND ADJUSTMENT

CROSS-REFERENCES TO OTHER APPLICATIONS

This application is a continuation of U.S. patent application Ser. No. 16/128,385 (now U.S. Pat. No. 10,891,126) entitled "ON-DEVICE FEATURE AND PERFORMANCE TESTING AND ADJUSTMENT" and filed on Sep. 11, 2018, for Brandon Dewitt et al., which claims the benefit of U.S. Provisional Patent Application No. 62/556,562 entitled "ON-DEVICE FEATURE AND PERFORMANCE TESTING AND ADJUSTMENT" and filed on Sep. 11, 2017, for Brandon Dewitt et al., and of U.S. Provisional Patent Application No. 62/561,203 entitled "ON-DEVICE ACCESSIBILITY FEATURE DETECTION AND SUBSTITUTION" and filed on Sep. 20, 2017, for Ryan McBride et al., each of which are incorporated herein by reference.

FIELD

This invention relates to features and capabilities of hardware devices and more particularly relates to dynamic testing and adjustment of features and performance based on the capabilities of a hardware device.

BACKGROUND

As hardware devices and their software become both more advanced and complex, the variation in capabilities and versions among different hardware devices is also increasing. It can be difficult to determine or maintain compatibility between different hardware devices.

SUMMARY

Apparatuses are presented for dynamic feature and performance testing and adjustment. In one embodiment, an audit module is configured to dynamically test a plurality of image capture settings for a camera of a mobile device of an end user in an executable mobile application executing on the mobile device of the end user. A feature module, in certain embodiments, is configured to select one of a plurality of image capture settings for a camera of a mobile device based on a dynamic test. In some embodiments, an adjustment module is configured to dynamically configure, during runtime of an executable mobile application on a plurality of different mobile devices of different end users, the different mobile devices to use a selected one of a plurality of image capture settings.

Other apparatuses are presented for dynamic feature and performance testing and adjustment. In one embodiment, an apparatus includes means for dynamically testing during runtime a plurality of image capture settings for a camera of a mobile device of an end user in an executable mobile application executing on the mobile device of the end user. An apparatus, in a further embodiment, includes means for selecting one of a plurality of image capture settings for a camera of a mobile device based on dynamic testing. In certain embodiments, an apparatus includes means for dynamically configuring, during runtime of an executable mobile application on a plurality of different mobile devices of different end users, the different mobile devices to use a selected one of a plurality of image capture settings.

Methods are presented for dynamic feature and performance testing and adjustment. A method, in one embodiment, includes dynamically testing during runtime a plurality of image capture settings for a camera of a mobile device of an end user in an executable mobile application executing on the mobile device of the end user. In certain embodiments, a method includes selecting one of a plurality of image capture settings for a camera of a mobile device based on dynamic testing. In a further embodiment, a method includes dynamically configuring, during runtime of an executable mobile application on a plurality of different mobile devices of different end users, the different mobile devices to use a selected one of a plurality of image capture settings.

In some embodiments, a feature module is disposed on a backend server and is configured to receive results of a dynamic test from a mobile device of an end user over a data network. A feature module, in a further embodiment, is configured to provide a selected one of a plurality of image capture settings to a plurality of different mobile devices over a data network.

A plurality of image capture settings, in various embodiments, comprise one or more of an image resolution setting, an image crop setting, an image gamma setting, an image blurriness setting, and/or an image sharpen setting. A plurality of image capture settings, in a further embodiment, comprise an image capture user interface setting for an executable mobile application. An image capture user interface setting, in some embodiments, comprises a setting indicating an image capture warning to display to an end user in an image capture user interface of an executable mobile application.

A feature module, in certain embodiments, is configured to select a different one of a plurality of image capture settings for different mobile device types. In a further embodiment, a feature module is configured to select a different one of a plurality of image capture settings for different mobile device makes and models.

An executable mobile application, in some embodiments, comprises a remote deposit capture mobile application configured to electronically deposit checks using images of checks captured by a camera of a mobile device of an end user. In one embodiment, a dynamic test comprises a success rate for electronic deposit of checks using images of checks captured by a camera of a mobile device of an end user using a plurality of image capture settings for the camera of the mobile device of the end user.

In some embodiments, a feature module is configured to select one of a plurality of image capture settings using machine learning. Results of a dynamic test of a plurality of image capture settings, in certain embodiments, are provided as input into machine learning to generate one or more predictions of one of a plurality of image capture settings to select.

An audit module, in some embodiments, is configured to update a dynamic test of a plurality of image capture settings at periodic intervals. In a further embodiment, a feature module is configured to reselect a different one of a plurality of image capture settings for a camera of a mobile device based on an updated dynamic test. An adjustment module, in one embodiment, is configured to dynamically reconfigure different mobile devices of different end users to use a different one of a plurality of image capture settings.

An adjustment module, in some embodiments, is configured to monitor for updates in a code repository for an executable mobile application. In a further embodiment, an adjustment module is configured to dynamically generate one or more builds of an executable mobile application based on an updated code repository and a selected one of a plurality of image capture settings. An adjustment module, in certain embodiments, is configured to install a dynamically generated one or more builds to execute on a plurality of different mobile devices such that the different mobile devices are configured to use a selected one of a plurality of image capture settings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
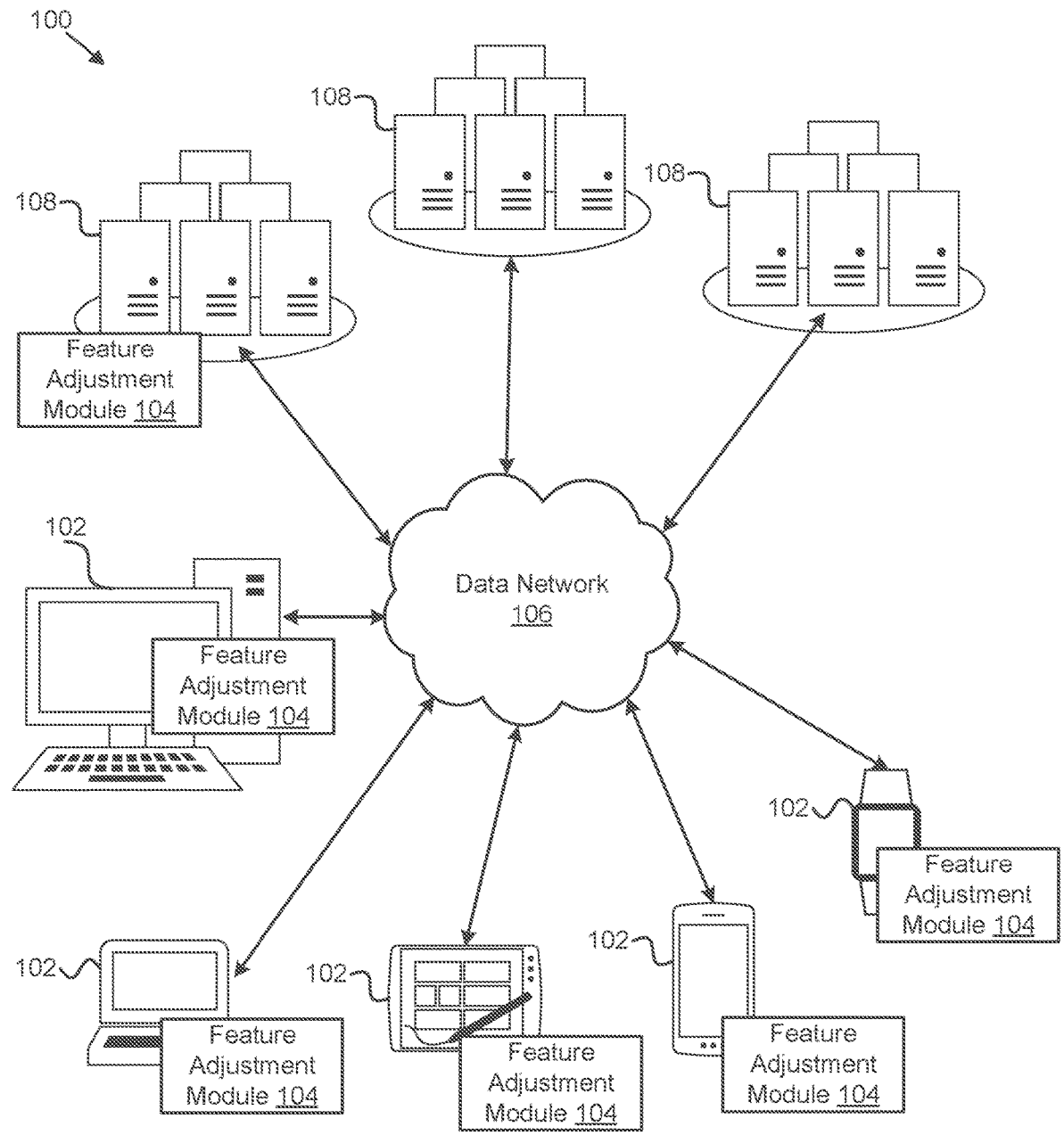
FIG. 1 is a schematic block diagram illustrating one embodiment of a system for on-device feature and performance testing and adjustment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (e.g., including firmware, resident software, micro-code, etc. stored on a non-transitory computer readable storage medium) or an embodiment combining software and hardware aspects that may all generally be referred to herein as a "circuit," "module," or "system." Furthermore, aspects of the present invention may take the form of a computer program product embodied in one or more non-transitory computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays (e.g., an application specific integrated circuit), off-the-shelf semiconductors such as logic chips, transistors, and/or other discrete components. A module may also be implemented in one or more programmable hardware devices such as field programmable gate arrays, programmable array logic, programmable logic devices, or the like.

Modules may also be implemented at least partially in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more non-transitory computer readable storage media. A computer program product may include a non-transitory computer readable storage medium (or media) storing computer readable program instructions thereon for causing a processor to carry out aspects of the present invention.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM"), a semiconductor memory device (e.g., NAND Flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), or the like), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, script instructions, machine dependent instructions, microcode, firmware instructions, state-setting data, or either source code or object code written in any combination of one or more programming languages, including an object oriented programming language such as Smalltalk, C++, Java, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for on-device feature and performance testing and/or adjustment. In one embodiment, the system 100 includes one or more devices 102 (e.g., hardware devices such as mobile hardware devices, virtual devices, simulated devices, and/or the like), one or more feature adjustment modules 104 (e.g., one or more feature adjustment modules 104 and/or a plurality of feature adjustment modules 104 disposed on the one or more devices 102), one or more data networks 106 or other communication channels, and/or one or more third-party service providers 108 (e.g., one or more servers 108 of one or more service providers 108; one or more cloud or network service providers 108, or the like). In certain embodiments, even though a specific number of devices 102, feature adjustment modules 104, data networks 106, and/or third-party service providers 108 are depicted in FIG. 1, one of skill in the art will recognize, in light of this disclosure, that any number of devices 102, feature adjustment modules 104, data networks 106, and/or third-party service providers 108 may be included in the system 100 for on-device feature and performance testing and/or adjustment.

In one embodiment, the system 100 includes one or more devices 102. The devices 102 (e.g., one or more hardware devices, computing devices, information handling devices, virtual devices, and/or simulated devices) may include one or more of a desktop computer, a laptop computer, a mobile device, a tablet computer, a smart phone, a set-top box, a gaming console, a mobile gaming device, a smart TV, a smart watch, a fitness band, an optical head-mounted display (e.g., a virtual reality headset, smart glasses, or the like), an HDMI or other electronic display dongle, a USB dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. The devices 102, in a further embodiment, are capable of executing various programs, program code, applications, instructions, functions, or the like.

One or more devices 102 may comprise a virtualized and/or simulated device 102, executing on a hardware device 102 or other computing hardware 102. A virtualized and/or simulated device 102 may execute a foreign code base (e.g., an application or other computer executable program code) for testing, as described above, in a sandbox environment or the like.

In certain embodiments, a feature adjustment module 104 is configured to scan, probe, and/or otherwise analyze hardware (e.g., hardware components, versions, performance, or the like) and/or software (e.g., an operating system, a version, an API, a device driver, a settings or configuration file, an installed application, a device driver, or the like) of a computing device 102 to determine one or more capabilities, compatibilities, or other attributes of the computing device 102. The feature adjustment module 104, in further embodiments, is configured to determine various features of a mobile device (e.g., functions, operations, subroutines, libraries, methods, interfaces, commands, parameters, hardware features, or the like of an operating system, a device driver, an application or the like), and may dynamically select and/or adjust execution of one or more features of a mobile device, based on the one or more determined capabilities, compatibilities, or other attributes of the computing device 102 affecting execution of the one or more features.

For example, the feature adjustment module 104 may select one or more features that the computing device 102 may provide and may select one or more other features to limit, so that the computing device 102 does not provide the one or more other features, or the like. In such an embodiment, the feature adjustment module 104 improves the functionality and usability of a mobile device by adjusting different features of an application, operating system, hardware features (e.g., camera resolution, speaker volume, video card performance characteristics, or the like) based on the capabilities of the mobile device so that certain features are enabled, disabled, or otherwise configured to execute at some level of functionality according to the capabilities of the mobile device.

In various embodiments, a feature adjustment module 104 may be embodied as hardware, software, or some combination of hardware and software. In one embodiment, a feature adjustment module 104 may comprise executable program code stored on a non-transitory computer readable storage medium for execution on a processor of a device 102, a hardware testing server device 102, or the like. For example, a feature adjustment module 104 may be embodied as executable program code executing on one or more of a device 102, a server device 108, a combination of one or more of the foregoing, or the like. In such an embodiment, the various modules that perform the operations of a feature adjustment module 104, as described below, may be located on a device 102, a server device 108, a combination of the two, and/or the like.

In various embodiments, a feature adjustment module 104 may be embodied as a hardware appliance that can be installed or deployed on a hardware server device 108, on a user's device 102 (e.g., a dongle or other peripheral device), or elsewhere on the data network 106. In certain embodiments, a feature adjustment module 104 may comprise a hardware device such as a secure hardware dongle or other hardware appliance device (e.g., a set-top box, a network appliance, or the like) that attaches to another device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of a feature adjustment module 104 may comprise a power interface, a wired and/or wireless network interface, a graphical interface that attaches to a display, and/or a semiconductor integrated circuit device as described below, configured to perform the functions described herein with regard to a feature adjustment module 104.

A feature adjustment module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a feature adjustment module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a feature adjustment module 104.

The semiconductor integrated circuit device or other hardware appliance of a feature adjustment module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a feature adjustment module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social network, a photo sharing site, a video sharing site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more feature adjustment modules 104 may provide central management of a networked swarm of feature adjustment modules 104. For example, the one or more feature adjustment modules 104 and/or a hardware server device 108 may store downloaded testing data and/or error data from the feature adjustment modules 104 centrally, may provide instructions and/or settings for the feature adjustment modules 104, or the like. A hardware server device 108 may include one or more servers located remotely from the devices 102, or the like. A hardware server device 108 may comprise hardware of a feature adjustment module 104, may store executable program code of a feature adjustment module 104 in one or more non-transitory computer readable storage media, and/or may otherwise perform one or more of the various operations of a feature adjustment module 104 described herein in order to perform automated testing.

In certain embodiments, a feature adjustment module 104 may manage a pool of internet protocol (IP) addresses for one or more devices 102 and/or associated applications. For example, in embodiments where multiple physical, virtual, and/or simulated devices 102 are used for distributed and/or decentralized downloading/aggregation of user data from one or more third-party service providers 108, as described below, a feature adjustment module 104 may ensure that the same IP address or set of one or more IP addresses is used for the same user, that IP addresses are rotated, or the like to avoid undue suspicion and/or blocking by a third-party service provider 108, allowing the user to access his/her own data (e.g., a user's photos, a user's social media posts, a user's medical records, a user's financial transaction records or other financial data, and/or other data associated with and/or owned by a user but stored by a server 108 of a third-party service provider 108).

In one embodiment, a feature adjustment module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party service providers 108. The feature adjustment module 104, in certain embodiments, accesses a server 108 of a third-party service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third-party service provider 108 (e.g., stored by hardware not owned, maintained, and/or controlled by the user). The feature adjustment module 104, in various embodiments, may provide the downloaded data to the user locally (e.g., displaying the data on an electronic display of a device 102); may provide the downloaded data from the device 102 of the user to a remote server (e.g., a remote feature adjustment module 104 on a server, or the like) which may be unaffiliated with the third-party service provider 108; may provide one or more alerts, messages, advertisements, or other communications to the user (e.g., on a device 102) based on the downloaded data; or the like.

In certain embodiments, the system 100 includes a plurality of feature adjustment modules 104 disposed/located on devices 102 of a plurality of different users (e.g., comprising hardware of and/or executable code running on one or more devices 102). The plurality of feature adjustment modules 104 may act as a distributed and/or decentralized system 100, executing across multiple devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a third-party service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many feature adjustment modules 104, in certain embodiments, may be much more difficult for a third-party service provider 108 to block.

In one embodiment, a device 102 may include and/or execute an internet browser, which a user may be used to access a server 108 of a third-party service provider 108 (e.g., by loading a webpage of the third-party service provider 108 in the internet browser). At least a portion of a feature adjustment module 104, in certain embodiments, may comprise a plugin to and/or an extension of an internet browser of a user's personal device 102, so that a third-party service provider 108 may not block the feature adjustment module 104 from accessing the server 108 of the third-party service provider 108 without also blocking the user's own access to the server 108 using the internet browser. For example, the feature adjustment module 104 may use the same cookies, IP address, saved credentials, or the like as a user would when accessing a server 108 of a third-party service provider 108 through the internet browser. In certain embodiments, the feature adjustment module 104 may support integration with multiple different types of internet browsers (e.g., on different devices 102).

A feature adjustment module 104, in certain embodiments, may mimic or s copy a user's behavioral pattern in accessing a server 108 of a third-party service provider 108, to reduce a likelihood that the third-party service provider 108 may distinguish access to the server 108 by a feature adjustment module 104 from access to the server 108 by a user. For example, a feature adjustment module 104 may visit one or more locations (e.g., webpages) of a server 108 of a third-party service provider 108, even if the feature adjustment module 104 does not intend to download data from each of the one or more locations, may wait for a certain delay time between accessing different locations, may use a certain scroll pattern, or the like, to mask the feature adjustment module 104's downloading and/or aggregating of a user's data, to reduce the chances of being detected and/or blocked by the third-party service provider 108.

In one embodiment, at least a portion of a feature adjustment module 104 may be integrated with or otherwise part of another application executing on a device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the feature adjustment module 104 downloads from a server 108 of a third-party service provider 108.

In one embodiment, the feature adjustment modules 104 comprise a distributed system 100, with the feature adjustment modules 104 and/or the associated devices 102 being tested, executing builds of applications, downloading data, or the like substantially independently (e.g., without a global clock, with independent success and/or failure of components). Distributed feature adjustment modules 104 may pass messages to each other and/or to a feature adjustment module 104, to coordinate testing, execution of builds of applications, display of objects associated with nodes of scene trees, or the like. In one embodiment, the feature adjustment modules 104 are decentralized (e.g., peer devices 102, associated with users or the like), rather than relying exclusively on a centralized server or other device to perform one or more testing functions.

In a distributed and/or decentralized system 100, a central entity, such as a remote and/or control feature adjustment module 104 and/or a hardware testing server device 102, 108, in certain embodiments, may still provide, to one or more feature adjustment modules 104, one or more messages comprising instructions for automated testing, remote user input for testing, adjusted and/or updated parameters of a scene tree, or the like. In a further embodiment, one or more feature adjustment modules 104 may pass messages to each other, such as instructions for automated testing, remote user input for automated testing, adjusted and/or updated parameters of a scene tree, or the like, in a peer-to-peer manner. In another embodiment, a central entity, such as a feature adjustment module 104, may initially seed one or more sets of instructions and/or other data for automated testing, and the one or more feature adjustment modules 104 may send it to other feature adjustment modules 104.

The one or more feature adjustment modules 104, in certain embodiments, may provide an interface (e.g., an application programming interface (API), a TCP/IP socket connection, or the like) to provide error data; screenshots; mirrored actions, objects, and/or commands; or the like to one or more other entities (e.g., another feature adjustment module 104, another hardware device 102, or the like). The interface, in one embodiment, comprises a private interface between feature adjustment modules 104 of users' devices 102 and one or more feature adjustment modules 104. For example, this may enable a feature adjustment module 104 to receive data from a feature adjustment module 104 on a user's device 102, provide a feature adjustment module 104 instructions, mirror input between devices 102, or the like. In another embodiment, the interface comprises a public and/or open interface, which may be secured and/or limited to authorized users, allowing a user to share access to the user's device 102 with one or more different feature adjustment modules 104 (e.g., administrators, customer service, and/or quality assurance representatives for one or more applications, operating systems, hardware, or the like of a hardware device 102) for automated testing and/or troubleshooting (e.g., remotely).

Figure 2:
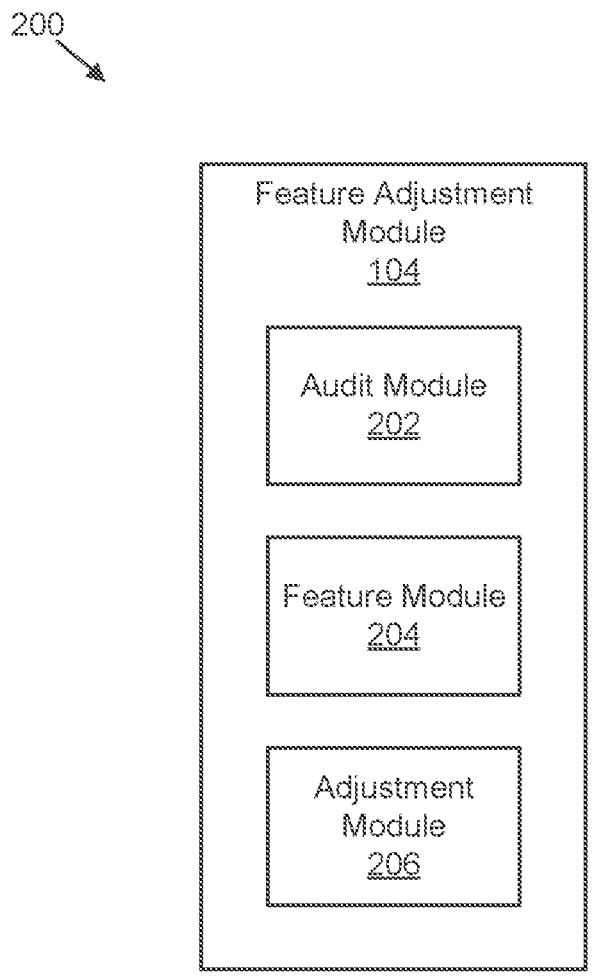
FIG. 2 is a schematic block diagram illustrating one embodiment of a module for on-device feature and performance testing and adjustment.

FIG. 2 depicts one embodiment of an apparatus 200 for on-device feature and performance testing and/or adjustment. In some embodiments, the apparatus 200 includes an embodiment of a feature adjustment module 104. In one embodiment, the feature adjustment module 104 includes one or more of an audit module 202, a feature module 204, and an adjustment module 206, which are described in more detail below.

In one embodiment, the audit module 202 is configured to determine one or more capabilities of a mobile device. An audit module 202, in one embodiment, may be disposed and/or installed on a mobile device in order to dynamically scan, probe, and/or otherwise analyze the mobile device to determine the capabilities of the hardware of the mobile device (e.g., different camera settings, graphics settings, sound settings, network settings, and/or the like) and/or the software of the mobile device (e.g., operating systems, device drivers, applications, services, and/or the like).

The audit module 202, in certain embodiments, may be a service that runs in the background and monitors for hardware or software capability changes, updates, or the like such as when new hardware is installed, a hardware driver is updated, a software application is updated, and/or the like. For example, the audit module 202 may monitor hardware ports/connections, update services for an operating system, for device drivers, for applications, a registry, or the like to detect when hardware and/or software changes have been made and therefore the capabilities of the mobile device may have been changed.

In one embodiment, the feature module 204 is configured to determine one or more potential features that are executable on the mobile device. The one or more potential features, in one embodiment, may include functions, operations, subroutines, libraries, methods, interfaces, commands, parameters, hardware features, and/or the like of an operating system, a device driver, an application or the like. The feature module 204, for example, may scan a registry or other lookup table that stores information describing the different features that are executable on the mobile device. In such an embodiment, applications, drivers, services, and/or the like may register with the feature module 204 to provide information regarding the features that are available, the performance requirements of the features (e.g., the processing cycles, networking bandwidth, camera resolution, memory usage, and/or the like that is required to execute the features), the minimum requirements for the features so that the features can still be executed at a partial or a lowered functionality, and/or the like.

In one embodiment, the adjustment module 206 is configured to selectively configure, during runtime, the one or more potential features that are executable on the mobile device (e.g., of an application or other computer executable code installed on the computing device 102, of a setting or parameter of hardware of the computing device 102, or the like) in response to execution of the one or more potential features being affected by s the one or more capabilities of the mobile device In one embodiment, the adjustment module 206 may determine whether performance of one or more software and/or hardware features and/or functions of a mobile device may be affected by, limited by, and/or prevented by capabilities (e.g., limited and/or lacking capabilities) of the mobile device. For instance, the adjustment module 204 may determine the current performance state of a processor, memory, graphics card, networking card, or the like, and may determine whether the current performance state will negatively impact or affect execution of various features that are executing or may be executed on the mobile device. The adjustment module 206 may adjust and/or block one or more features and/or functions during runtime, thereby customizing features, an experience, or the like for the mobile device, different devices 102, different software instances, different executions (e.g., at different times), or the like, based on available performance capabilities.

In certain embodiments, the audit module 202 may analyze one or more hardware and/or software capabilities of a mobile device and/or the adjustment module 206 may adjust one or more features of a mobile device on the device itself, without being instructed by and/or communicating with a user, an administrator, a server 108, a third-party device, or other remote computing device 108, or the like over a data network 106. In certain embodiments, the adjustment module 206 enables one or more potential features that are executable with full functionality based on the current capabilities of the mobile device. In certain embodiments, the adjustment module 206 reduces a performance of one or more capabilities of the mobile device to allow one or more potential features that would otherwise not be executable on the mobile device to execute on the mobile device.

The adjustment module 206, in one embodiment, may decide which features to enable and/or disable using machine learning, artificial intelligence, or the like. For example, a feature adjustment module 104 may provide information identifying one or more capabilities of a mobile device as one or more inputs into machine learning, artificial intelligence, or the like, and receive a selection, prediction, and/or recommendation of one or more features to provide, features to limit, or the like as one or more outputs. In a further embodiment, the adjustment module 206 may use a decision tree, a predetermined ruleset, a look up table (LUT), or the like to determine one or more features of a mobile device to provide and/or to limit, based on a determined capability of the mobile device.

In one embodiment, an adjustment module 206 may be configured to monitor updates in a repository of computer executable code (e.g., a code repository hosting service, a version control and/or source code management system, a source code file, a directory, or the like). An adjustment module 206 may monitor a repository of computer executable code to detect a code commit, a code commit of a predefined type, a predefined number of code commits, a commit to a predefined or flagged portion of code, and/or another update to computer executable code of the repository.

In response to detecting an update, an adjustment module 206 may automatically and/or dynamically generate one or more builds for hardware devices 102 using the updated computer executable code such that various features of the updated computer executable code are executable on a hardware device 102. For example, an adjustment module 206 may compile or otherwise build different versions of the updated computer executable code (e.g., using different compilers, different compiler flags or settings, different compiler targets, or the like) for different devices 102 (e.g., different makes and/or models), devices 102 with different operating systems and/or operating system versions, or the like. The computer executable code of the monitored repository may comprise at least a portion of an adjustment module 206, one or more hooks or interfaces for an adjustment module 206, a shared library for an adjustment module 206, or the like. An adjustment module 206 may automatically and/or dynamically install the one or more builds (e.g., compiled applications, operating systems, firmware, or the like) on a plurality of hardware devices 102, over a data network 106 or the like.

In one embodiment, the audit module 202 is configured to update the determined capabilities of the mobile device at periodic intervals (e.g., seconds, minutes, days, or the like) and the adjustment module 206 is configured to reconfigure the one or more potential features that are executable on the mobile device in response to updating the determined capabilities of the mobile device.

In further embodiments, the audit module 202 is configured to update the determined capabilities of the mobile device in response to a triggering event such as detecting a change in a hardware configuration (e.g., installation of new hardware) and/or a software configuration (e.g., update or install of applications, update or install of device drivers, or the like) of the mobile device, and the adjustment module 206 is configured to reconfigure the one or more potential features that are executable on the mobile device in response to updating the determined capabilities of the mobile device.

In this manner, the feature adjustment module 104 can dynamically, automatically (e.g., without user confirmation), on the fly, or the like enable features for execution on the mobile device, disable features executing on the mobile device, or adjust how a feature executes on a mobile device (e.g., by limiting functionality, performance, resource usage, and/or the like) based on the capabilities of the mobile device.

Figure 3:
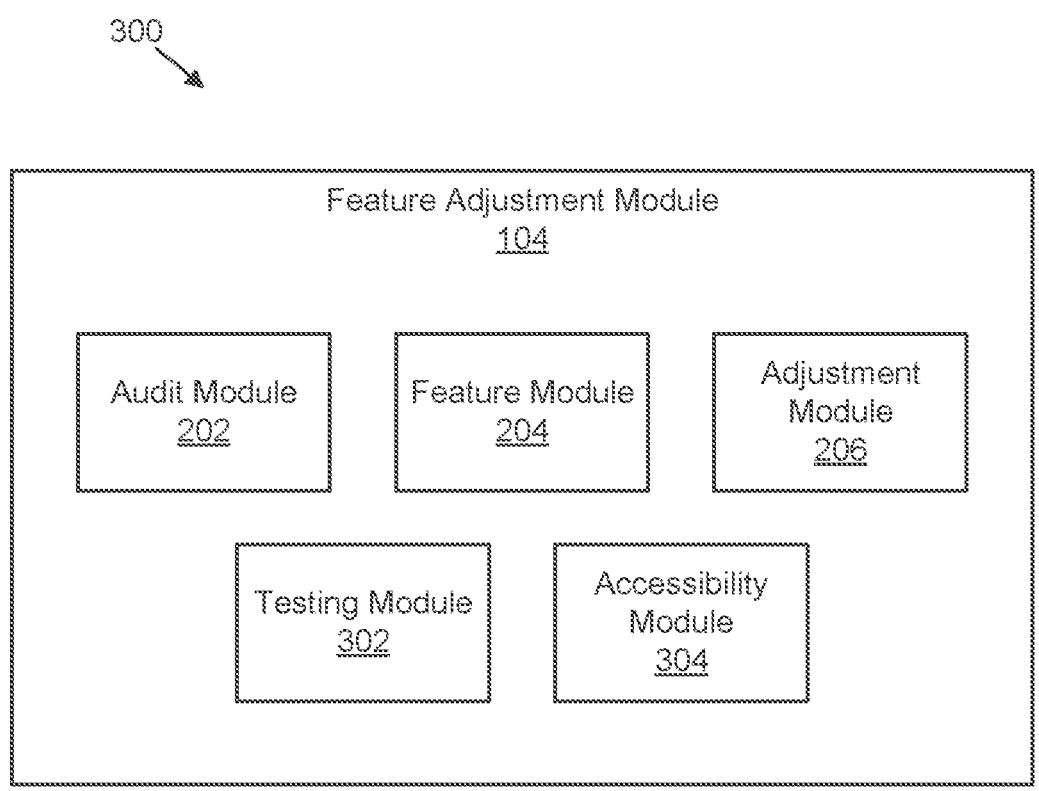
FIG. 3 is a schematic block diagram illustrating one embodiment of another module for on-device feature and performance testing and adjustment.

FIG. 3 depicts one embodiment of an apparatus 300 on-device feature and performance testing and/or adjustment. In some embodiments, the apparatus 300 includes an embodiment of a feature adjustment module 104. In one embodiment, the feature adjustment module 104 includes one or more of an audit module 202, a feature module 204, and an adjustment module 206, which may be substantially similar to the audit module 202, feature module 204, and adjustment module 206 described above with reference to FIG. 2. In further embodiments, the feature adjustment module 104 includes instances of a testing module 302 and an accessibility module 304, which are described in more detail below.

In one embodiment, the testing module 302 automates testing of hardware and/or software features executing on one or more devices 102 with varying capabilities, such as different mobile devices executing different operating systems. For example, one or more testing modules 302 may enable testing (e.g., quality assurance, troubleshooting, customer service, debugging, reverse engineering, or the like) of one or more features, capabilities, applications, services, drivers, and/or the like executing on one or more devices 102, of one or more operating systems executing on one or more devices 102, of hardware of one or more devices 102, or the like. In certain embodiments, one or more testing module 302 may test a plurality of different devices 102 (e.g., running the same applications, running different applications, or the like) in parallel, even if the different devices 102 are using different platforms (e.g., desktop platforms such as Microsoft® Windows®, Apple® OS X®, Linux®, or the like; mobile platforms such as Apple® iOS, Google® Android®, or the like; and/or other platforms).

A testing module 302 may provide simulated and/or automated user input to one or more devices 102 (e.g., to a device 102 itself, to an operating system of a device 102, to an adjustment module 206 located on a device 102, or the like) over a data network 106 (e.g., using a TCP/IP socket connection or the like), such as one or more key presses, one or more button presses, one or more other touch input events (e.g., one or more taps, swipes, pinches, drags, keystrokes), and/or the like.

Simulated and/or automated user input, such as a touch input event, instead of comprising an actual user touch of a touchscreen, touchpad, or the like, may comprise a command provided over a data network 106 or other digital communications channel, triggering a user input event, a touch input event, or the like remotely (e.g., in an automated fashion). A simulated and/or automated user input event such as a touch input event may have the same or similar effect on a hardware device 102 receiving the simulated and/or automated user input event as an actual user input event performed and/or triggered directly by an actual user.

A testing module 302, in certain embodiments, may pause or wait a delay period between automated and/or simulated user interface commands (e.g., user input events, touch input events, or the like), to simulate input provided by an actual user, with natural pauses, delays, and/or timing. In a further embodiment, a user may manually step through a script or other list of commands and/or user input events, using a graphical user interface (GUI) of a testing module 302 (e.g., by selecting a "next" button, or the like to move to the next command or instruction in the script).

A testing module 302 may receive, audit, review, and/or provide an administrator or other user with access to data from a device 102 and/or application before, during, and/or after a trigger, such as executing an operation, providing a simulated and/or automated user input event such as a touch input event, satisfying a time period or timer, or the like. The data may be related to the capabilities of the device 102 and/or the features that are executable on the device such as, for example, error data such as state information for a hardware device 102, an application, and/or an operating system; a screenshot; a hierarchical scene tree and/or nodes thereof; a system file; an application file; a database; a database table; a database record; a log; a log entry; a value for a runtime variable of an application and/or operating system; a value for a memory pointer used by an application and/or operation; a network communication such as an API request or a query or the like; an identifier of a hardware device 102; an identifier of an application executing on a hardware device 102; or the like.

For example, in certain embodiments, a testing module 302 on a device 102 may provide an administrator or a different system (e.g., a testing module 302 on a server 108) with a screenshot from the device 102 and/or an associated application, with a data structure (e.g., a file, a database, a database table, a database record, a log or log entry, a value for a variable, a value for a pointer, or the like) from the device 102 and/or an associated application, with a communication (e.g., one or more data packets, a payload, an API request, a query, or other input/output (I/O) data to or from the device 102 and/or an associated application), with one or more identifiers of and/or execution data for one or more executing processes (e.g., data from volatile memory, data from a file system, data from a run-time stack, or the like), with an identifier of a device 102 (e.g., a make, a model, a manufacturer, a vendor, a version number, a name, or the like), with an identifier of an application executing on a device 102 (e.g., an application name, an application version number, an operating system version, or the like) and/or other data.

In one embodiment, an administrator or other user may query and/or request data from a device 102 and/or an associated application using an interface (e.g., a web interface, a GUI, an API, a CLI, or the like) of a feature adjustment module 104 (e.g., which may forward and/or relay the request to a testing module 302 at the administrator's or other user's device, which may return the requested data from a hardware device 102). In one embodiment, an administrator or other user may write and/or provide to a GUI of a testing module 302 (e.g., providing user input to a web interface over a data network 106; providing user input locally to a user input device of a hardware device 102 such as a keyboard, touchscreen, touchpad, and/or mouse; or the like) a script or other list of multiple commands and/or user input events (e.g., touch input events) to be simulated or otherwise executed on one or more devices 102 by one or more testing modules 302.

A testing module 302 may provide a library of scripts, a library of commands, a library of user input events, or the like for a user to reference and/or include in a script. A testing module 302 may provide a user with a GUI in which the user may build a script using one or more sub-scripts, user input events, supported commands, or the like. A testing module 302 may communicate one or more commands of a script to one or more testing devices 102 (e.g., in parallel, in a distributed manner, or the like). In certain embodiments, a testing module 302 may translate a command and/or a script for different platforms and/or devices 102. In a further embodiment, different testing modules 302 may translate a command and/or a script for executing on their associated devices 102.

In certain embodiments, a script may walk through and/or test an entire GUI of an application executing on a device 102, a portion of a GUI of an application executing on a device 102, or the like (e.g., using a script, in response to separate commands or other user input from a user, without a script simulating a sequence of random user input events such as touch input events, without a script systematically performing an exhaustive or substantially exhaustive sequence of user input events such as touch input events for each location and/or user input element of the GUI or portion thereof, or the like).

In one embodiment, while one or more testing modules 302 execute commands and/or simulated user interface events, the different devices 102 being tested may display the associated interactions graphically on the electronic displays of the devices 102. A testing module 302, in certain embodiments, may visually highlight or otherwise mark a user interface element (e.g., a button, a text field, a radio button, a checkbox, a slider, a dial, or the like) associated with a simulated user interface event such as a touch input event.

A GUI of a testing module 302, in certain embodiments, may display a scene tree or other listing of user interface elements to a user (e.g., which may be received from a device 102, which a user may select to view additional data, which a user may select to automatically include in a script, or the like). In certain embodiments, instead of and/or in addition to executing a script, a testing module 302 may provide an interface allowing a user to provide input (e.g., one or more simulated user input events) and may mirror the provided input (e.g., touch input events) on one or more testing devices 102 (e.g., which may actually receive the provided input in independently executing applications on the different devices 102, as touch input events or the like, instead of simply mirroring a display). A testing module 302 may simulate one or more touch input events or other user input events (e.g., mirrored, based on a script, or the like) on different devices 102 by screen location (e.g., x- and y-coordinates or the like), by user interface element (e.g., a label or other identifier for a node in a hierarchical screen tree representing a displayed object so that the event is interpreted similarly even for different screen orientations, different versions of an application, or the like), and/or using a different input location identifier.

In further embodiments, one or more testing modules 302 may maintain a log or other testing data structure, with entries and/or records for a plurality of events (e.g., errors, failures, executing an operation, providing simulated and/or automated user input, satisfying a time period or timer, or the like). A testing module 302, in certain embodiments, may include testing data and/or references to testing data in the log or other testing data structure (e.g., screenshots, memory dump, variable values, pointer values, or the like). For example, a testing module 302 may automatically gather testing data (e.g., take a screenshot, save a memory dump, or the like) in response to an error, a failure, providing a simulated user input event, and/or another trigger. In one embodiment, a user may define what testing data is stored in a log or other testing data structure using a GUI of a testing module 302, or the like. A testing module 302 may store a log or other testing data structure on a device 102 and/or may stream or forward a log or other testing data structure to a testing module 302 on a different device 102. A testing module 302 may display one or more logs to a user in a GUI on an electronic display of a hardware device 102, remotely on a webpage served from a hardware device 102 over a data network 106, or the like.

In one embodiment, a testing module 302 may display to a user a list of one or more supported and/or testing enabled devices 102, on the same data network 106, registered with the same account, or the like. A user, in certain embodiments, may select one or more devices 102 from the displayed list for testing (e.g., executing a script, mirroring provided input, or the like). A user, in a further embodiment, may select one or more scripts, commands, touch input events, and/or user input events for executing on and/or providing to the selected one or more devices 102.

In certain embodiments, a testing module 302 may push or otherwise send data to a device 102 and/or to a testing module 302 on a device 102, such as an application or other executable code for testing (e.g., automated code deployment for testing, quality assurance, troubleshooting, or other purposes), variable values, pointer values, data files, data for storing in volatile memory of a device 102, or the like. A testing module 302 may q determine data to push or send based on user input (e.g., selected and/or defined by a user), from a script, from a settings file, or the like.

A testing module 302, in certain embodiments, may connect to a device 102 in response to an end-user request from the device 102 itself, to troubleshoot and/or provide customer support to the user, or the like. In a further embodiment, a testing module 302 may connect to one or more devices 102 (e.g., a single device 102, a plurality of many devices 102, or the like) as part of an automated quality assurance process, prior to providing the one or more devices 102 and/or to a software application to a vendor, to customers, or the like. For example, a testing module 302 may test various aspects of an application, may collect data for comparison and/or review, or the like in an automated fashion, from multiple different devices 102, instead of or in addition to requiring manual testing by multiple quality assurance engineers, or the like.

In one embodiment, a testing module 302 may be used to gather information from a device 102 and/or an application, for testing and/or investigation purposes. For example, a testing module 302 may monitor and/or test I/O from an application, files associated with and/or used by an application, data in volatile memory of an application, to test and/or determine a quality or correctness of an API connection between a device 102 or application and a server 108, an authentication process or procedure used by a device 102 or application and a server 108, functions executed and/or supported between a server 108 and a device 102 or application, data transmitted between a device 102 or application and a server 108, a format of a request and/or of data between a device 102 or application and a server 108, or the like. By capturing such information, a testing module 302 may allow a user to troubleshoot and/or debug a device 102 or application, to replicate and/or improve the functionality of a device 102 and/or application (e.g., in another device 102 and/or application), to discover and take advantage of one or more services (e.g., APIs) provided by a server 108, or the like.

A testing module 302 may automatically and/or dynamically (e.g., with little or no user input) perform one or more testing protocols (e.g., a predefined test script or other list of instructions comprising one or more user input events such as touch input events, a predefined set of tests comprising one or more simulated user input events such as touch input events, or the like). In response to performing one or more testing protocols, a testing module 302 may receive data from the tested devices 102, such as the error data described above (e.g., state information for a hardware device 102, an application, and/or an operating system; a screenshot; a hierarchical scene tree and/or nodes thereof; a system file; an application file; a database; a database table; a database record; a log; a log entry; a value for a runtime variable of an application and/or operating system; a value for a memory pointer used by an application and/or operation; a network communication such as an API request or a query or the like; an identifier of a hardware device 102; an identifier of an application executing on a hardware device 102; or the like).

In one embodiment, the accessibility module 304 is configured to determine one or more accessibility capabilities of the mobile device. The one or more accessibility capabilities, in certain embodiments, comprises one or more of hardware and software features for altering default functionality of the mobile device to assist a user experience for persons with disabilities. For example, an accessibility capability may comprise a screen reader that vocalizes displayed text (e.g., text-to-speech), speech recognition allowing a user to control a hardware device 102 verbally, a magnifier that increases the displayed size of at least a portion of a graphical user interface displayed on an electronic screen of a hardware device 102, a high-contrast theme or graphical user interface, an enlarged cursor, closed-captioning, mono audio through both channels (e.g., so users with hearing disabilities in one ear won't miss the associated audio channel), sticky keys to assist users who have a difficulty pressing multiple keys at once allowing them to press key combinations one at a time, an alternate keyboard, and/or another feature.

In response to detecting one or more predefined and/or user selected accessibility features or capabilities activated or otherwise in use on a hardware device 102, in certain embodiments, the adjustment module 206 may replace a detected accessibility feature with a replacement and/or substitute accessibility feature (e.g., provided by the adjustment module 206 or the accessibility module 304, or the like). For example, an accessibility feature provided by a hardware device 102 and/or an operating system thereof, may not be compatible with and/or properly operate with an application (e.g., computer executable code), and the adjustment module 206 may provide a replacement and/or substitute accessibility feature that is compatible, operates properly, provides one or more additional features and/or functions, or the like than the detected accessibility feature. In one embodiment, an adjustment module 206 changes and/or alters an initial experience (e.g., an initial display screen of a graphical user interface, initial audio output, an initial input requested from a user, or the like) in response to detecting that an accessibility feature is active, or the like (e.g., automatically, dynamically, or the like, without input from a user selecting the replacement and/or substitute accessibility feature, or the like).

As described above, the adjustment module 206 may select one or more accessibility features that the mobile device may provide and may select one or more other accessibility features to limit, so that the mobile device does not provide the one or more other accessibility features, or the like. An adjustment module 206, in certain embodiments, may determine whether performance of one or more software and/or hardware accessibility features and/or functions of a mobile device may be affected by, limited by, and/or prevented by capabilities (e.g., limited and/or lacking capabilities) of the mobile device, and may adjust and/or block one or more accessibility features and/or functions during runtime, thereby customizing accessibility features, an experience, or the like for different devices 102, different software instances, different executions (e.g., at different times), or the like, based on available performance capabilities, detected accessibility features, or the like.

Furthermore, an accessibility module 304, in one embodiment, may be disposed and/or installed on the mobile device, in order to dynamically scan, probe, and/or otherwise analyze active accessibility features of the mobile device, adjust accessibility features of the mobile device (e.g., of an application or other computer executable code installed on the mobile device, of a setting or parameter of hardware of the mobile device, or the like). In certain embodiments, an accessibility module 304 may analyze one or more hardware and/or software capabilities of a mobile device and/or adjust one or more accessibility features of a mobile device on the device 102 itself, without being instructed by and/or communicating with a user, a server 108 or other remote computing device 108, or the like over a data network 106.

In certain embodiments, the adjustment module 206, in one embodiment, may decide which accessibility features to enable and/or disable using machine learning, artificial intelligence, or the like. For example, the adjustment module 206 may provide information identifying one or more accessibility capabilities of a mobile device, active accessibility features, or the like as one or more inputs into machine learning, artificial intelligence, or the like, and receive a selection, prediction, and/or recommendation of one or more accessibility features to replace, substitute, provide, limit, or the like as one or more outputs. In a further embodiment, the adjustment module 206 may use a decision tree, a predetermined ruleset, a look up table (LUT), or the like to determine one or more accessibility features of a mobile device to replace, substitute, provide, and/or to limit, based on one or more detected accessibility features, capabilities, or the like of the mobile device.

Figure 4:
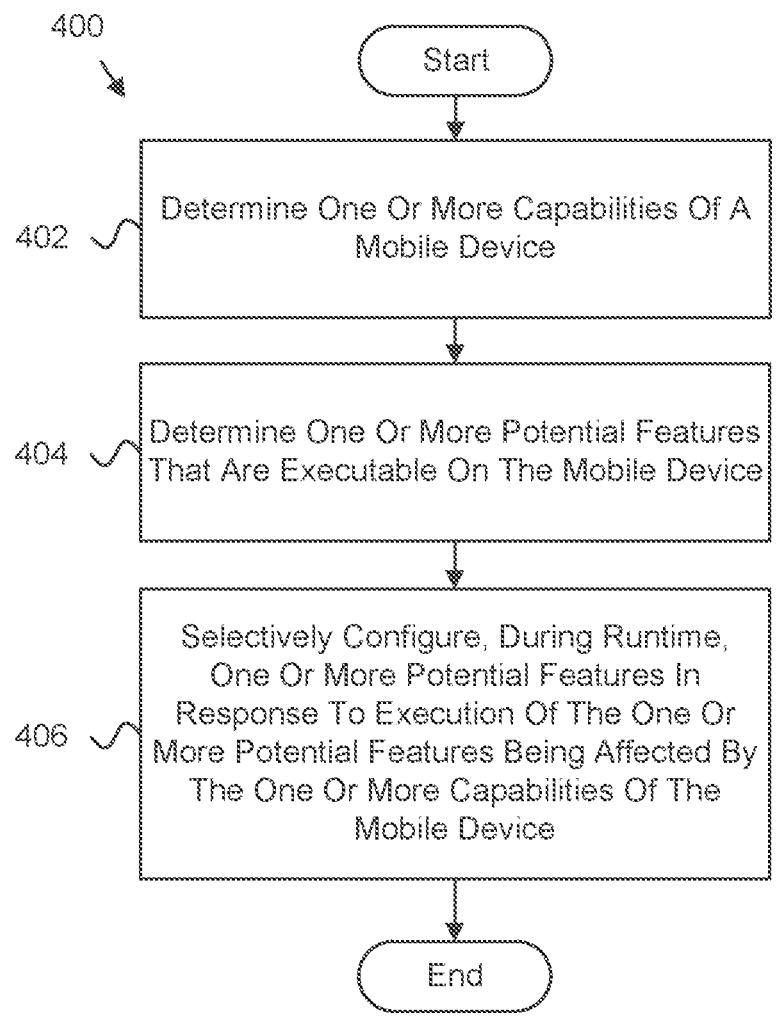
FIG. 4 is a schematic block diagram illustrating one embodiment of a method for on-device feature and performance testing and adjustment.

FIG. 4 depicts a flow-chart diagram illustrating one embodiment of a method 400 for on-device feature and performance testing and/or adjustment. In one embodiment, the method 400 begins and the audit module 202 determines 402 one or more capabilities of a mobile device. In certain embodiments, the feature module 204 determines 404 one or more potential features that are executable on the mobile device. In further embodiments, the adjustment module 206 selectively configures 406, during runtime, the one or more potential features that are executable on the mobile device in response to execution of the one or more potential features being affected by the one or more capabilities of the mobile device, and the method 400 ends.

A means for determining one or more capabilities of a mobile device, in various embodiments, may include an audit module 202, a feature adjustment module 104, a processor, an FPGA, an ASIC, a computing device 102, other logic hardware, and/or other executable code stored on a computer readable storage medium. Other embodiments may include similar or equivalent means for determining one or more capabilities of a mobile device.

A means for determining one or more potential features that are executable on the mobile device, in various embodiments, may include a feature module 204, a feature adjustment module 104, a processor, an FPGA, an ASIC, a computing device 102, other logic hardware, and/or other executable code stored on a computer readable storage medium. Other embodiments may include similar or equivalent means for determining one or more potential features that are executable on the mobile device.

A means for selectively configuring, during runtime, the one or more potential features, in various embodiments, may include an adjustment module 206, a feature adjustment module 104, a processor, an FPGA, an ASIC, a computing device 102, other logic hardware, and/or other executable code stored on a computer readable storage medium. Other embodiments may include similar or equivalent means for selectively configuring, during runtime, the one or more potential features.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an audit module configured to:
      determine hardware and software capabilities of a mobile device of an end user; and
      dynamically test, during runtime, different camera settings for a camera of the mobile device of the end user in an executable mobile application executing on the mobile device of the end user to determine which of the different camera settings for the camera of the mobile device of the end user are limited by the determined hardware and software capabilities of the mobile device of the end user, wherein the different camera settings for the camera of the mobile device of the end user comprises different features of a device driver for the camera of the mobile device of the end user;
   a feature module configured to select at least one of the different camera settings for the camera of the mobile device of the end user based on the dynamic test of the different camera settings for the camera of the mobile device of the end user and in response to the determined hardware and software capabilities of the mobile device of the end user not limiting performance of the selected at least one of the different camera settings for the camera of the mobile device of the end user based on performance requirements of the selected at least one of the different camera settings for the camera of the mobile device of the end user; and
   an adjustment module configured to dynamically enable the selected at least one of the different camera settings for the camera of the mobile device of the end user on a plurality of different mobile devices of different end users without user confirmation, during runtime of the executable mobile application executing on the plurality of different mobile devices of the different end users.

2. The apparatus of claim 1, wherein the feature module is disposed on a backend server, and is further configured to receive results of the dynamic test of the different camera settings for the mobile device of the end user over a data network, and is further configured to provide the selected one of the different camera settings for the camera of the mobile device of the end user to the plurality of different mobile devices of the different end users over the data network.

3. The apparatus of claim 1, wherein the different camera settings for the camera of the mobile device of the end user comprise one or more of an image resolution setting, an image crop setting, an image gamma setting, an image blurriness setting, and an image sharpen setting.

4. The apparatus of claim 1, wherein the different camera settings for the camera of the mobile device of the end user comprise an image capture user interface setting for the executable mobile application executing on the mobile device of the end user.

5. The apparatus of claim 4, wherein the image capture user interface setting for the executable mobile application executing on the mobile device of the end user comprises a setting indicating an image capture warning to display to the end user in an image capture user interface of the executable mobile application executing on the mobile device of the end user.

6. The apparatus of claim 1, wherein the feature module is further configured to select a different one of the different camera settings for the camera of the mobile device of the end user for different mobile device types.

7. The apparatus of claim 1, wherein the feature module is further configured to select a different one of the different camera settings for the camera of the mobile device of the end user for different mobile device makes and models.

8. The apparatus of claim 1, wherein the executable mobile application executing on the mobile device of the end user comprises a remote deposit capture mobile application configured to electronically deposit checks using images of the checks captured by the camera of the mobile device of the end user.

9. The apparatus of claim 8, wherein the dynamic test of the different camera settings for the camera of the mobile device of the end user comprises a success rate for the electronic deposit of the checks using the images of the checks captured by the camera of the mobile device of the end user using the different camera settings for the camera of the mobile device of the end user.

10. The apparatus of claim 1, wherein the feature module is further configured to select the selected one of the different camera settings for the camera of the mobile device of the end user using machine learning, and results of the dynamic test of the different camera settings for the camera of the mobile device of the end user provided as input into the machine learning to generate one or more predictions of the one of the different camera settings for the camera of the mobile device of the end user to select.

11. The apparatus of claim 1, wherein:
   the audit module is further configured to update the dynamic test of the different camera settings for the camera of the mobile device of the end user at periodic intervals;
   the feature module is further configured to reselect a different one of the different camera settings for the camera of the mobile device of the end user based on the updated dynamic test of the different camera settings for the camera of the mobile device of the end user; and
   the adjustment module is further configured to dynamically reconfigure the plurality of different mobile devices of the different end users to use the different one of the different camera settings for the camera of the mobile device of the end user.

12. The apparatus of claim 1, wherein the adjustment module is further configured to:
   monitor for updates in a code repository for the executable mobile application executing on the mobile device of the end user;
   dynamically generate one or more builds of the executable mobile application executing on the mobile device of the end user based on the updates in the code repository and the selected one of the different camera settings for the camera of the mobile device of the end user; and install the dynamically generated one or more builds of the executable mobile application executing on the mobile device of the end user to execute on the plurality of different mobile devices of the different end users such that the plurality of different mobile devices of the different end users are configured to use the selected one of the different camera settings for the camera of the mobile device of the end user.

13. A method, comprising:

determining hardware and software capabilities of a mobile device of an end user;

dynamically testing, during runtime, different camera settings for a camera of the mobile device of the end user in an executable mobile application executing on the mobile device of the end user to determine which of the different camera settings for the camera of the mobile device of the end user are limited by the determined hardware and software capabilities of the mobile device of the end user, wherein the different camera settings for the camera of the mobile device of the end user comprises different features of a device driver for the camera of the mobile device of the end user;

selecting at least one of the different camera settings for the camera of the mobile device of the end user based on the dynamic test of the different camera settings for the camera of the mobile device of the end user and in response to the determined hardware and software capabilities of the mobile device of the end user not limiting performance of the selected at least one of the different camera settings for the camera of the mobile device of the end user based on performance requirements of the selected at least one of the different camera settings for the camera of the mobile device of the end user; and dynamically enabling the selected at least one of the different camera settings for the camera of the mobile device of the end user on a plurality of different mobile devices of different end users without user confirmation, during runtime of the executable mobile application executing on the plurality of different mobile devices of the different end users.

14. The method of claim 13, further comprising selecting a different one of the different camera settings for the camera of the mobile device of the end user for different mobile device makes and models.

15. The method of claim 13, further comprising:

updating the dynamic test of the different camera settings for the camera of the mobile device of the end user at periodic intervals;

reselecting a different one of the different camera settings for the camera of the mobile device of the end user based on the updated dynamic test of the different camera settings for the camera of the mobile device of the end user; and dynamically reconfiguring the plurality of different mobile devices of the different end users to use the different one of the different camera settings for the camera of the mobile device of the end user.

16. The method of claim 13, further comprising:

monitoring for updates in a code repository for the executable mobile application executing on the mobile device of the end user;

dynamically generating one or more builds of the executable mobile application executing on the mobile device of the end user based on the updates in the code repository and the selected one of the different camera settings for the camera of the mobile device of the end user; and installing the dynamically generated one or more builds of the executable mobile application executing on the mobile device of the end user to execute on the plurality of different mobile devices of the different end users such that the plurality of different mobile devices of the different end users are configured to use the selected one of the different camera settings for the camera of the mobile device of the end user.

17. An apparatus, comprising:

means for determining hardware and software capabilities of a mobile device of an end user;

means for dynamically testing, during runtime, different camera settings for a camera of the mobile device of the end user in an executable mobile application executing on the mobile device of the end user to determine which of the different camera settings for the camera of the mobile device of the end user are limited by the determined hardware and software capabilities of the mobile device of the end user, wherein the different camera settings for the camera of the mobile device of the end user comprises different features of a device driver for the camera of the mobile device of the end user;

means for selecting at least one of the different camera settings for the camera of the mobile device of the end user based on the dynamic test of the different camera settings for the camera of the mobile device of the end user and in response to the determined hardware and software capabilities of the mobile device of the end user not limiting performance of the selected at least one of the different camera settings for the camera of the mobile device of the end user based on performance requirements of the selected at least one of the different camera settings for the camera of the mobile device of the end user; and means for dynamically enabling the selected at least one of the different camera settings for the camera of the mobile device of the end user on a plurality of different mobile devices of different end users without user confirmation, during runtime of the executable mobile application executing on the plurality of different mobile devices of the different end users.

18. The apparatus of claim 17, further comprising means for selecting a different one of the different camera settings for the camera of the mobile device of the end user for different mobile device makes and models.

19. The apparatus of claim 17, further comprising:

means for updating the dynamic test of the different camera settings for the camera of the mobile device of the end user at periodic intervals;

means for reselecting a different one of the different camera settings for the camera of the mobile device of the end user based on the updated dynamic test of the different camera settings for the camera of the mobile device of the end user; and means for dynamically reconfiguring the plurality of different mobile devices of the different end users to use the different one of the different camera settings for the camera of the mobile device of the end user.

20. The apparatus of claim 17, further comprising:

means for monitoring for updates in a code repository for the executable mobile application executing on the mobile device of the end user;

means for dynamically generating one or more builds of the executable mobile application executing on the mobile device of the end user based on the updates in the code repository and the selected one of the different camera settings for the camera of the mobile device of the end user; and means for installing the dynamically generated one or more builds of the executable mobile application executing on the mobile device of the end user to execute on the plurality of different mobile devices of the different end users such that the plurality of different mobile devices of the different end users are configured to use the selected one of the different camera settings for the camera of the mobile device of the end user.

\* \* \* \* \*